(12) United States Patent
Ko et al.

(10) Patent No.: US 12,455,995 B2
(45) Date of Patent: Oct. 28, 2025

(54) CHIPLET BASED ARTIFICIAL INTELLIGENCE ACCELERATORS AND CONFIGURATION METHODS

(71) Applicant: MemryX Incorporated, Ann Arbor, MI (US)

(72) Inventors: Ching-Yu Ko, Ann Arbor, MI (US); Chester Liu, Ann Arbor, MI (US); Mohammed Zidan, Ann Arbor, MI (US); Jacob Botimer, Ann Arbor, MI (US); Timothy Wesley, Ann Arbor, MI (US); Zhengya Zhang, Ann Arbor, MI (US); Wei Lu, Ann Arbor, MI (US)

(73) Assignee: MemryX Incorporated, Ann Arbor, MI (US)

( * ) Notice: Subject to any disclaimer, the term of this patent is extended or adjusted under 35 U.S.C. 154(b) by 1148 days.

(21) Appl. No.: 17/118,381

(22) Filed: Dec. 10, 2020

(65) Prior Publication Data
US 2022/0188492 A1  Jun. 16, 2022

(51) Int. Cl.
*G06F 30/331* (2020.01)
*G06F 18/214* (2023.01)
*G06F 30/337* (2020.01)
*G06N 3/08* (2023.01)

(52) U.S. Cl.
CPC ........ *G06F 30/331* (2020.01); *G06F 18/2148* (2023.01); *G06F 30/337* (2020.01); *G06N 3/08* (2013.01)

(58) Field of Classification Search
CPC .. G06F 30/331; G06F 18/2148; G06F 30/337; G06N 3/08
See application file for complete search history.

(56) References Cited

U.S. PATENT DOCUMENTS

| | | | |
|---|---|---|---|
| 9,710,265 B1 | 7/2017 | Temam et al. | |
| 2016/0026912 A1 | 1/2016 | Falcon et al. | |
| 2019/0087716 A1* | 3/2019 | Du | G06F 15/786 |
| 2019/0205740 A1 | 7/2019 | Judd et al. | |

FOREIGN PATENT DOCUMENTS

WO  WO-2020190814 A1 *  9/2020  ......... G06F 12/0215

OTHER PUBLICATIONS

Ascia, G., et al. (Sep. 2020). Improving inference latency and energy of DNNs through wireless enabled multi-chip-module-based architectures and model parameters compression. In 2020 14th IEEE/ACM International Symposium on Networks-on-Chip (NOCS) (pp. 1-6). IEEE. (Year: 2020).*

(Continued)

*Primary Examiner* — Bijan Mapar

(57) ABSTRACT

A processing unit can include a plurality of chiplets coupled in a cascade topology by a plurality of interfaces. A set of the plurality of cascade coupled chiplets can be configured to execute a plurality of layers or blocks of layers of an artificial intelligence model. The set of cascade coupled chiplets can also be configured with parameter data of corresponding ones of the plurality of layers or blocks of layers of the artificial intelligence model.

19 Claims, 9 Drawing Sheets

(56) References Cited

OTHER PUBLICATIONS

Ascia, G., et al. (May 2020). Improving inference latency and energy of network-on-chip based convolutional neural networks through weights compression. In 2020 IEEE International parallel and distributed processing symposium workshops (IPDPSW) (pp. 54-63). IEEE. (Year: 2020).*

Shao, Y. S., Clemons, J., Venkatesan, R., Zimmer, B., Fojtik, M., Jiang, N., . . . & Keckler, S. W. (Oct. 2019). Simba: Scaling deep-learning inference with multi-chip-module-based architecture. In Proceedings of the 52nd annual IEEE/ACM international symposium on microarchitecture (pp. 14-27). (Year: 2019).*

Yao Chen et al. Cloud-DNN: An Open Framework for Mapping DNN Models to Cloud FPGAs. FPGA '19. The 2019 ACM/SIGDA International Symposium on Field-Programmable Gate Arrays. Feb. 24, 2019. pp. 73-82. Sections 1-3, 5-6; and figures 4,6.

* cited by examiner though a processing unit for executing an artificial intelligence
CHIPLET BASED ARTIFICIAL INTELLIGENCE ACCELERATORS AND CONFIGURATION METHODS

BACKGROUND OF THE INVENTION

A growing use of computing devices involve intelligent applications utilizing artificial intelligence, machine learning, deep learning and the like applications. Intelligent applications can include image recognition, language processing, autonomous vehicle controls, medical diagnostics, search engines, and the like. Artificial intelligence as used herein refers to techniques that enable devices to mimic human intelligence, using logic, if-then rules, decision trees, and the like. Machine learning includes a subset of artificial intelligence that includes abstruse statistical techniques that enable machines to improve at tasks with experience. Deep learning includes a subset of machine learning that includes algorithms that permit software to train itself to perform tasks by exposing multilayered artificial neural networks, recurrent neural networks (RNN), convolution neural networks (CNN) or the like to vast amounts of data. For ease of explanation, artificial intelligence, as used herein, also includes machine learning, deep learning and the like. In addition, neural network, as used herein, also includes artificial neural networks (ANN), recurrent neural networks (RNN), convolution neural networks (CNN), deep neural networks (DNN), graph neural networks (GNN) and the like.

Large-scale artificial intelligence models can include many layers or modules, as illustrated in FIGS. 1A and 1B. The layers or modules and associate data can be mapped to the resources of a processing unit such as, but not limited to, an artificial intelligence accelerator. However, the artificial intelligence accelerator is limited by the physical size of its monolithic integrated circuit (IC) chip. As the size of artificial intelligence models increase, it is difficult or impossible to fit all the parameters of the entire artificial intelligence model on a processing chip. Therefore, a common approach is to bring the parameters for a layer or a block of layers onto the chip, perform the associated computations, and write the result for the layer of block of layers back to memory, and then fetch parameters for another layer or block of layers onto the chip. However, bring parameters for each layer or block of layers on chip, writing back results of the given layer or block of layers, and repeating consumes a substantially amount of data communication bandwidth resulting in substantially processing latency. The substantial amount of data communication can also consume a substantial amount of power. Accordingly, there is a continuing need for improved systems and methods for executing artificial intelligence models.

SUMMARY OF THE INVENTION

The present technology may best be understood by referring to the following description and accompanying drawings that are used to illustrate embodiments of the present technology directed toward artificial intelligence accelerators.

In one embodiment, a processing unit can include a plurality of chiplets including interfaces to communicatively cascade the plurality of chiplets or a subset thereof together. The plurality of chiplets or subsets thereof can be configured to execute layers or blocks of layers of one or more artificial intelligence models. The plurality of chiplets or subsets thereof can also be configured with parameter data of the one or more artificial intelligence models.

In another embodiment, a method of configuring a processing unit can include mapping a plurality of layers of an artificial intelligence model to a set of cascaded chiplets. The cascaded chiplets can be configured to execute the plurality of layers of the artificial intelligence model based on the mapping. The cascaded chiplets can also be configured with parameter data of corresponding ones of the plurality of layers of the artificial intelligence model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1A:
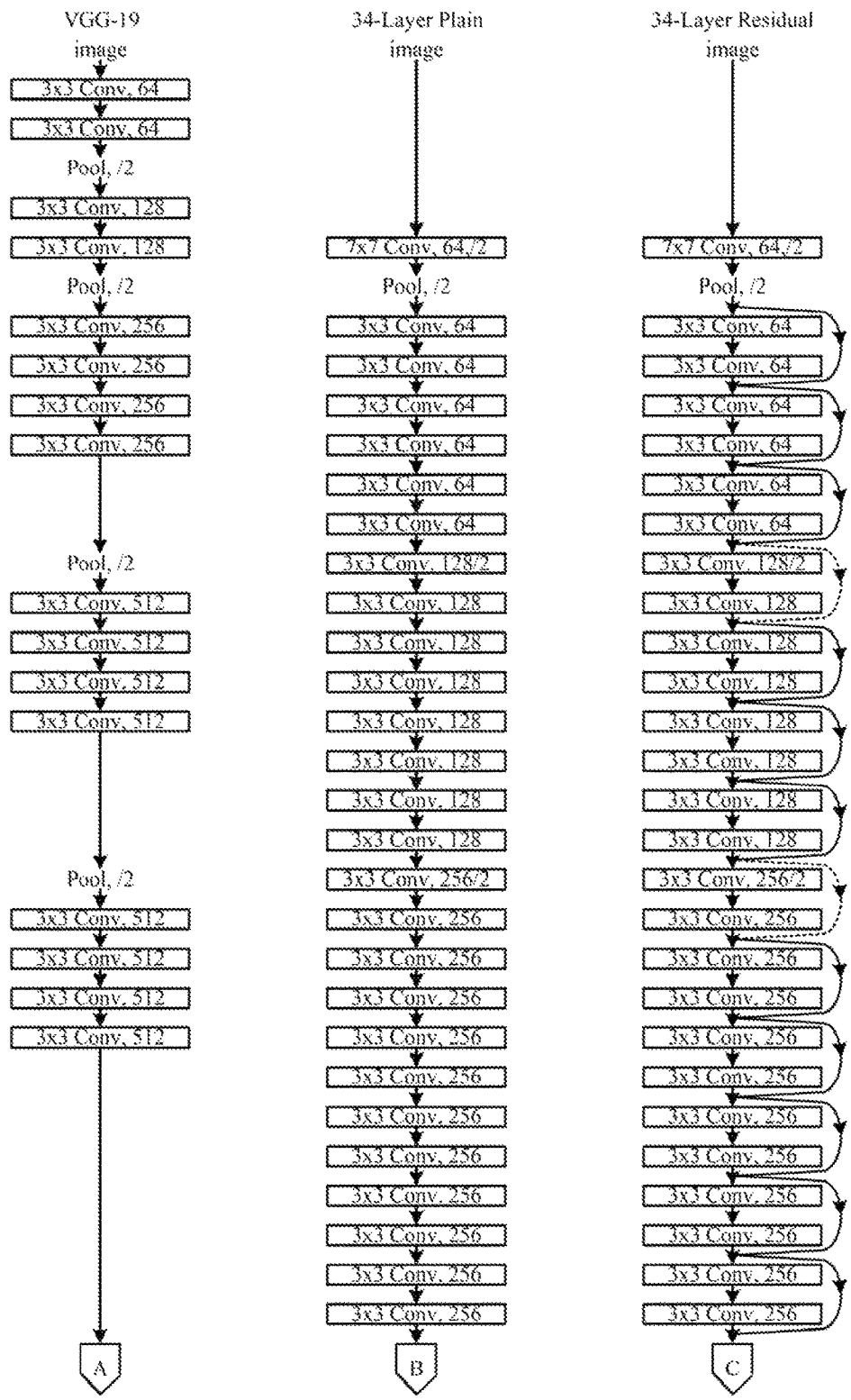
FIGS. 1A and 1B illustrate an exemplary artificial intelligence model including a plurality of layers and a plurality of blocks of layers.
Figure 1B:
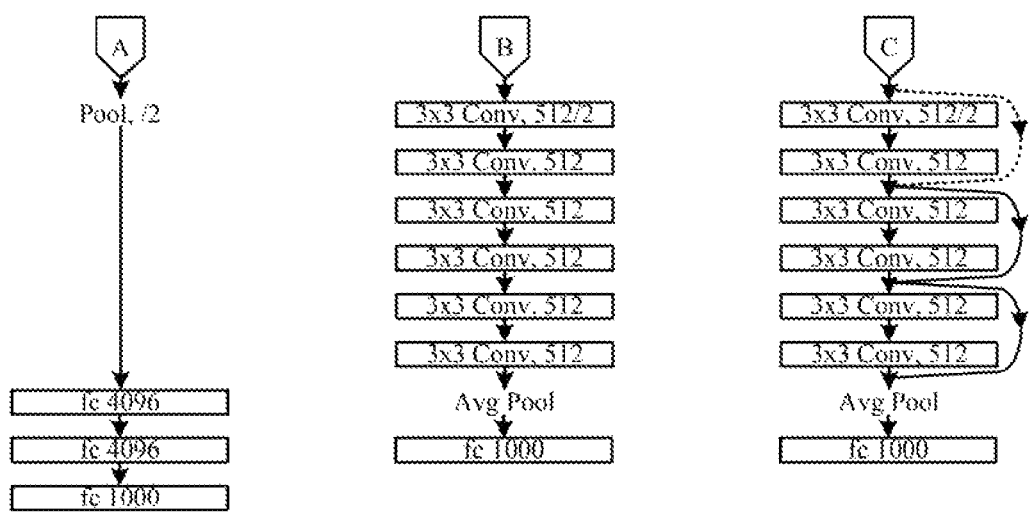

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 2:
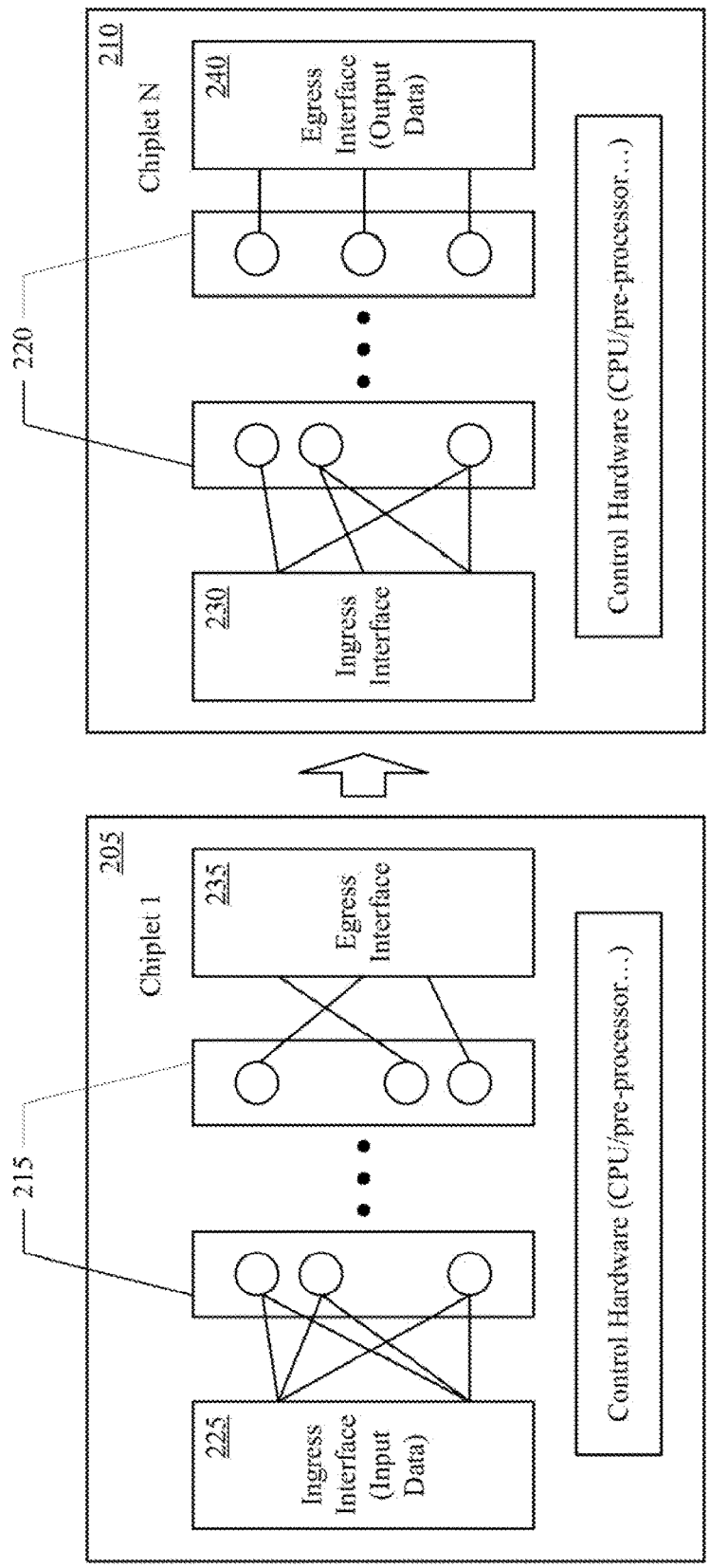
FIG. 2 illustrates deployment of an artificial intelligence model on a processing unit including a plurality of chiplets, in accordance with aspects of the present technology.

Referring now to FIG. 2, deployment of an artificial intelligence model on a processing unit, in accordance with aspects of the present technology, is illustrated. The processing unit 200 can be an artificial intelligence accelerator including a plurality of chiplets 205, 210. The plurality of chiplets can be packaged as a multi-chiplet module or the like. As used herein, a chiplet is a monolithic integrated circuit die that has been designed to work with other similar chiplets to form a larger more complex chip. The plurality of chiplets 205,210 can be homogeneous or heterogeneous. The plurality of chiplets 205, 210 can be configurable to execute one or more layers and or one or more blocks of layers 215, 220 of one or more artificial intelligence models. In one implementation, the one or more artificial intelligence models can include one or more neural network models. The plurality of chiplets 205, 210 can also be configurable with parameter data, including but not limited to configuration data, activation data, weights or the like, of the one or more artificial intelligence models.

The plurality of chiplets 205, 210 can include interfaces 225-240 to communicatively cascade the plurality of chiplets 205, 210 together. Each of the chiplets 205, 210, can include an ingress interface 225, 230, and an egress interface 235, 240. The interfaces 225-240 can be configured to transfer one or more feature map data streams between adjacent cascaded ones of the plurality of chiplets 205, 210 during training and inference modes. The interfaces 225-240 can also be configured to transfer commands between adjacent cascaded ones of the plurality of chiplets 205, 210 during configuration and or during training and inference modes. The interfaces 225-240 can include one or more clock lines configured to transmit one or more clock signals to synchronize the plurality of chiplets 205, 210. The interfaces 225-240 can also include one or more control buses configured to transmit one or more control signals. The interfaces 225-240 can also include one or more data buses configured to transmit one or more data streams.

Figure 3:
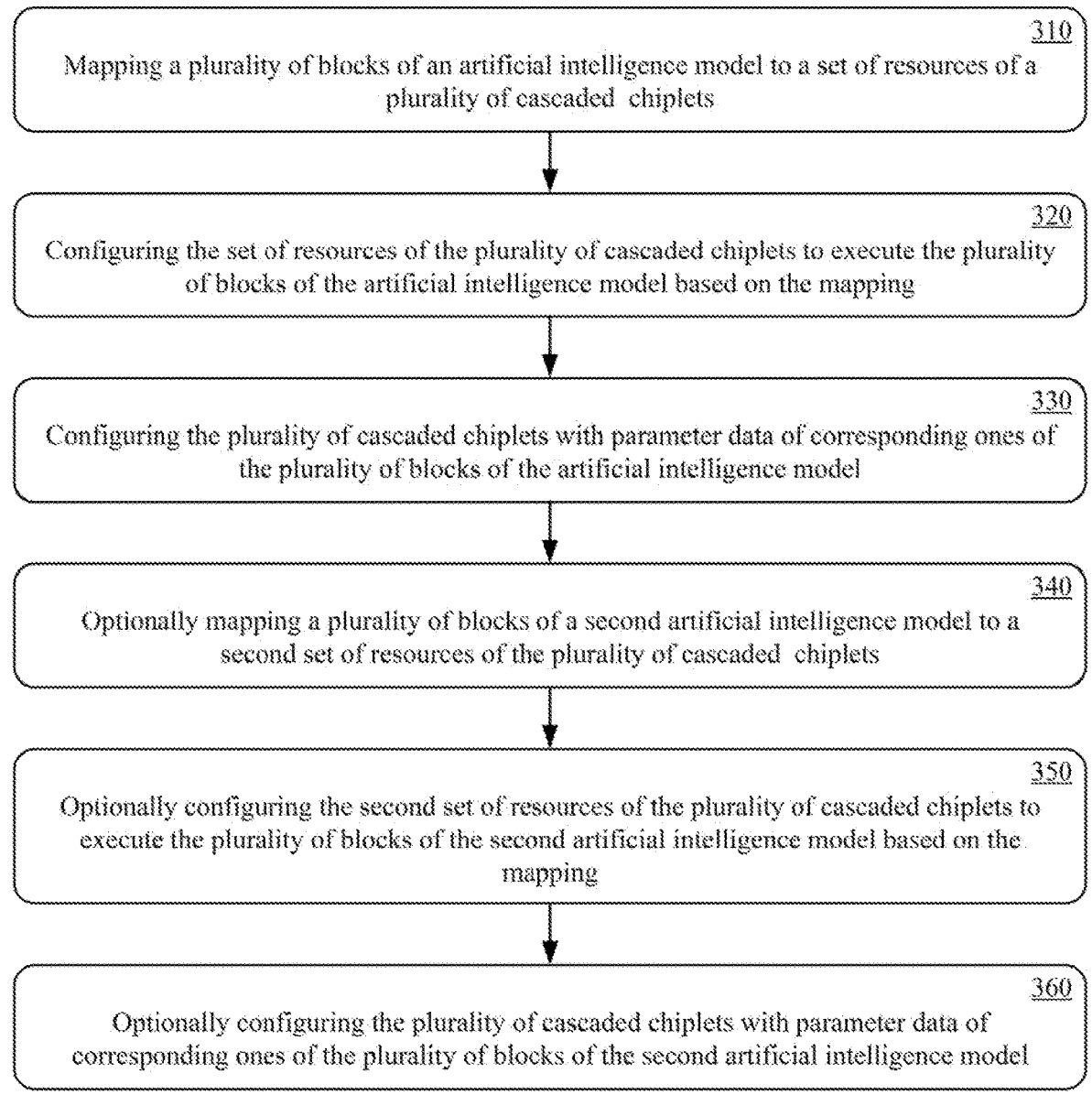
FIG. 3 shows a flow diagram of a method of configuring a processing unit for executing an artificial intelligence model, in accordance with aspects of the present technology.

Referring now to FIG. 3, a method of configuring a processing unit for executing an artificial intelligence model, in accordance with aspects of the present technology, is shown. The method can include mapping a plurality of layers or blocks of layers of an artificial intelligence model to a set of cascaded chiplets, at 310. For example, a first set of one or more layers and or blocks of layers of the artificial intelligence model can be mapped to the compute resources of a first chiplet. A second set of one or more layers and or blocks of layers of the artificial intelligence model can be mapped to the compute resources of a second chiplet.

At 320, a plurality of cascaded chiplets can be configured to execute the plurality of layers of the artificial intelligence model based on the mapping. For example, compute resources of respective chiplets can be configured to perform compute functions of respective layers of the artificial intelligence model. On-chiplet memory, interfaces and dataflow between the compute resources, the interfaces and the on-chiplet memory can also be configured based on the mapping. In one implementation, the on-chiplet memory can include on-chiplet volatile memory buffers, such as static random-access memory (SRAM), for storing feature map data. The on-chiplet memory can also include on-chiplet non-volatile memory, such as Flash, resistive random-access memory (RRAM), phase change random access memory (PRAM) or the like, for storing activation data. Interfaces for cascade coupling the chiplets together can also be configured as respective egress and ingress interfaces. The egress and ingress interfaces can be symmetrical. The interfaces can be configured to transfer data streams, such as but not limited to feature maps, between adjacent cascaded ones of the plurality of chiplets. The interfaces can also be configured to transfer commands, clock signals and the like between adjacent cascaded ones of the plurality of chiplets.

At least one interface of at least one chiplet can also be configured as an external input/output interface, such as a universal serial bus (USB), peripheral component interface express (PCIe) bus or the like, of the processing unit.

At 330, the plurality of cascaded chiplets can be configured with parameter data of corresponding ones of the plurality of layers of the artificial intelligence model. For example, respective portions of activation data for the artificial intelligence model can be loaded into on-chiplet memory of respective chiplets.

Optionally, a plurality of instance of one or more layers of the artificial intelligence model can be mapped to the set of the cascaded chiplets. Additional instances of the one or more layers of the artificial intelligence model can be mapped to the set of the cascaded chiplets to improve performance. The cascaded chiplets can then be configured to execute the plurality of instances of the one or more layers, and the cascaded chiplets can also be configured with parameter data of corresponding instances of the one or more layers of the artificial intelligence model. Similarly, multiple copies of the artificial intelligence model can be mapped to different sets of the cascaded chiplets so that the processing unit can run multiple copies of the artificial intelligence model at the same time.

Optionally, a plurality of layers of a second artificial intelligence model can also be mapped to a second set of the cascaded chiplets, at 340. The first and second set of chiplets can be separate, overlapping or mutually exclusive sets within the plurality of cascaded chiplets. The cascaded chiplets can also be configured to execute the plurality of layers of the second artificial intelligence mode based on the corresponding mapping, at 350. The cascaded chiplets can also be configured with parameter data of corresponding ones of the plurality of layers of the second artificial intelligence model, at 360. Configuring the cascaded plurality of chiplets to perform a second artificial intelligence model can be employed to improve utilization of the processing unit, where the resources of the cascaded plurality of chiplets are not fully consumed by the first artificial intelligence mode. In addition, the mapping and configuration can be further extended to configure the processing unit for executing even more artificial intelligence models if computing resources are available.

Figure 4:
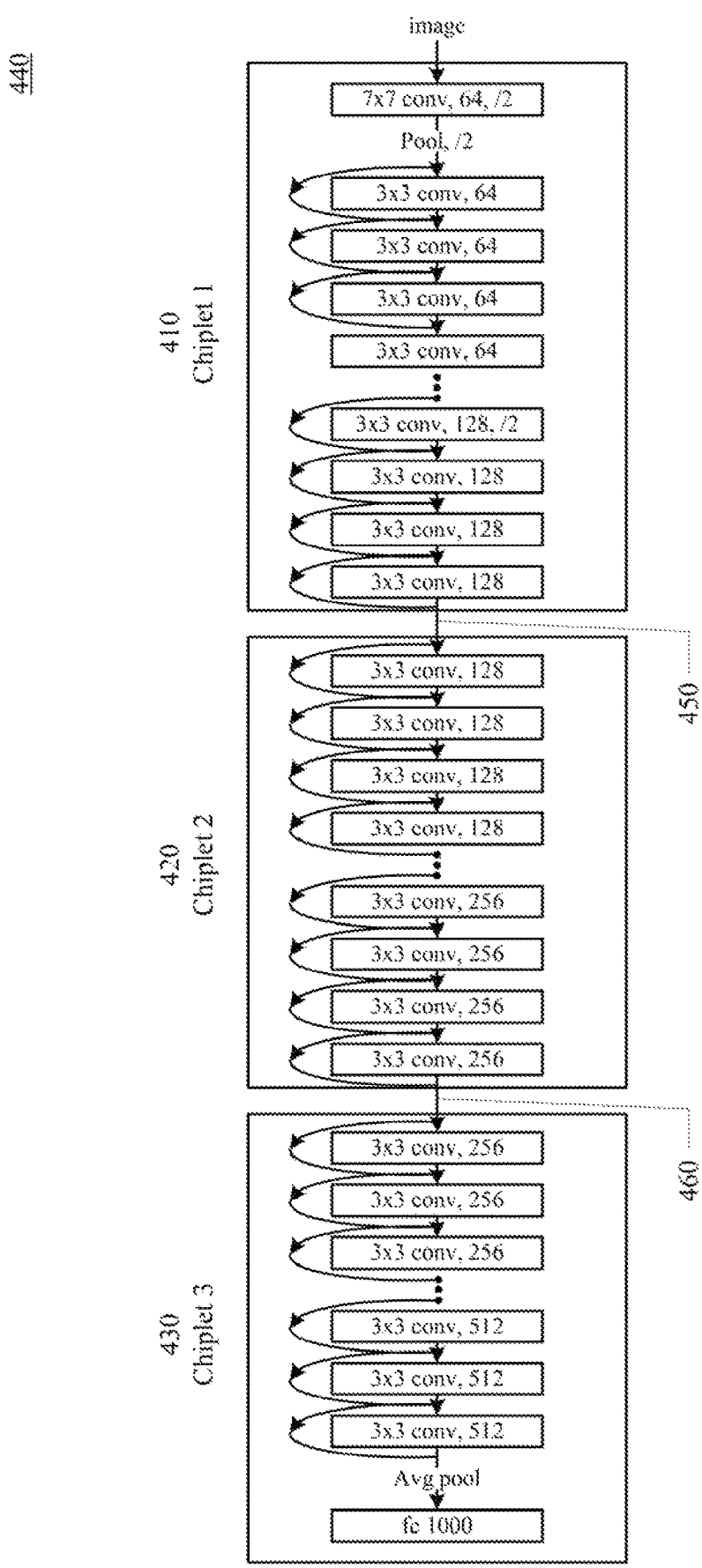
FIG. 4, illustrates an exemplary deployment of an artificial intelligence model on a processing unit including a plurality of chiplets, in accordance with aspects of the present technology.

Referring now to FIG. 4, an exemplary deployment of an artificial intelligence model on a processing unit, in accordance with aspects of the present technology. The processing unit can include a plurality of artificial intelligence accelerator chiplets 410-430 coupled together in a package 440. The plurality of chiplets 410-430 can be coupled together in a cascade topology by a plurality of interfaces 450, 460. The cascade interface 450, 460 provide an efficient interface that supports data streaming from adjacent chiplets to adjacent chiplets.

A set of the plurality of cascade coupled chiplets can be configured to execute a plurality of layers and or blocks of layers of a given artificial intelligence model. For example, a first chiplet 410 can be configured to execute a first block of an artificial intelligence model, a second chiplet 420 can be configured to execute a second block of the artificial intelligence model, and a third chiplet 430 can be configured to execute a third block of the artificial intelligence model. The cascade chiplets 410-430 can also be configured with parameter data of corresponding ones of the plurality of blocks of the artificial intelligence model. The parameters can stay on the respective chiplet 410-430 and do not need to be repeatedly fetched from and or written to off-chiplet memory.

The plurality of interfaces 450,460 can include one or more data buses configured to transmit one or more data streams. For example, the plurality of interface 450, 460 can be configured to transfer a feature map data stream between adjacent ones of the plurality of cascade coupled chiplets 410-430. The plurality of interfaces 450,460 can also include one or more clock lines configured to transmit one or more clock signals to synchronize the plurality of chiplets 410-430. The plurality of interfaces 450,460 can also include one or more control buses configured to transmit control information. For example, the plurality of interfaces 450, 460 can transmit one or more control signals to identify data stream numbers. The plurality of interfaces 450, 460 can also transmit one or more control signals to identify commands. Control signals can indicate bandwidth requirements, supported commands and data stream numbers, and the like.

Although FIG. 4 illustrates a package including three artificial intelligence accelerator chiplets 410-430 and that the given artificial intelligence model is mapped to all three chiplets, 410-430, a package can include any number of chiplets. Furthermore, a given artificial intelligence model can be implemented on a subset of the chiplets. The other chiplets can be utilized to execute additional copies of the same artificial intelligence model, or one or more other artificial intelligence models.

Figure 5:
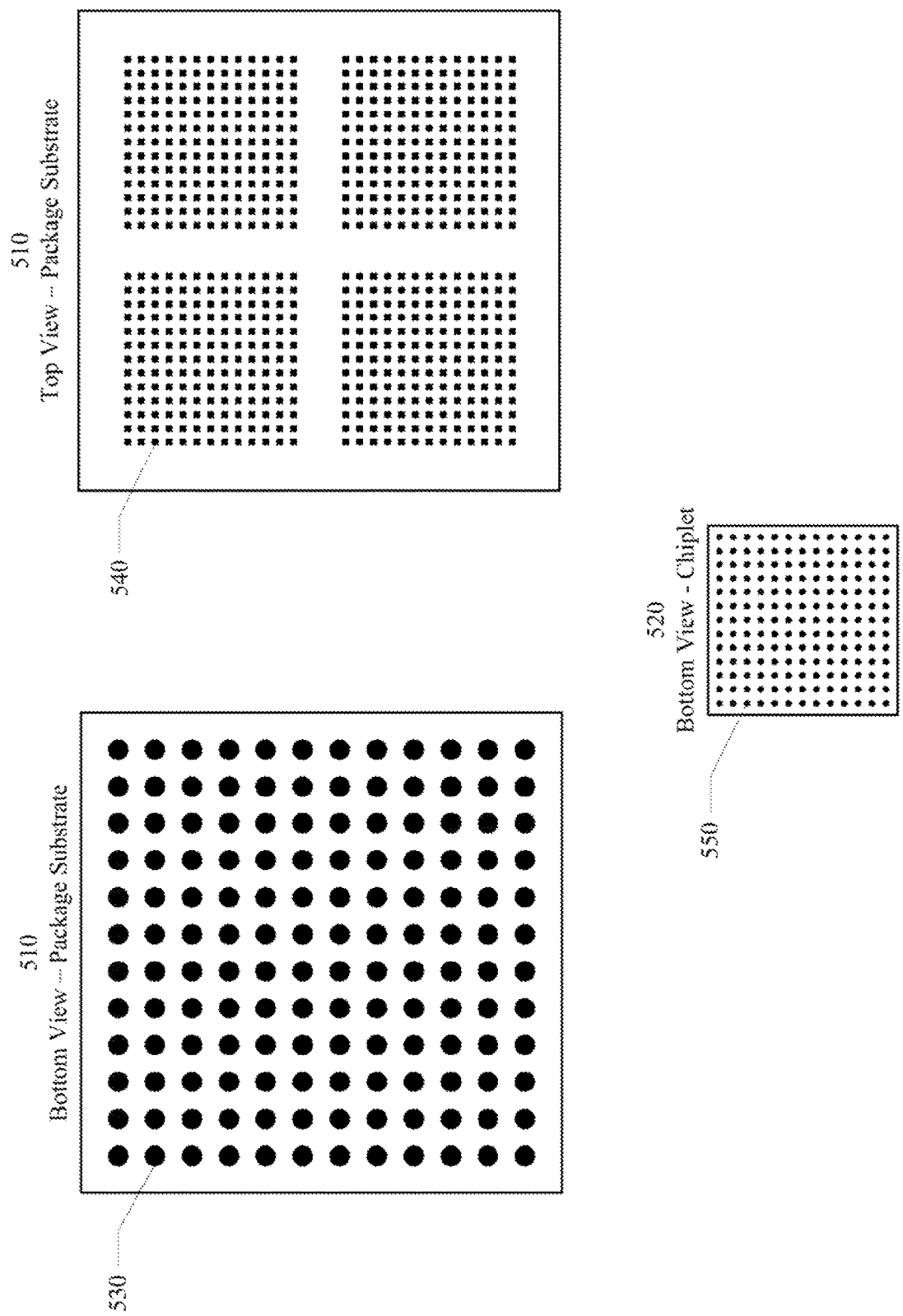
FIG. 5 shows package elements of an artificial intelligence processing unit including a plurality of chiplets, in accordance with aspects of the present technology.

Referring now to FIG. 5, package elements of an artificial intelligence processing unit, in accordance with aspects of the present technology, is shown. The package can include a package substrate 510 and one or more chiplets 520. A first side (bottom) of the package substrate 510 can include a first set of contacts 530 configured for external coupling of the processing unit. For example, a ball grid array of contacts of a first pitch can be configured for coupling the package to a printed circuit board (PCB) or the like. A second side of the package substrate 510 can include a plurality of second sets of contacts 540 configured for coupling chiplets 520 to respective ones of the second sets of contacts 540. Similarly, the chiplets 520 can include a set of contacts 550 configured for coupling the chiplet 520 to a respective one of the second set of contacts 540 of the package substrate 510. For example, a ball grid array of contacts of a second pitch can be configured for coupling the chiplets 520 to corresponding contacts on the second side of the package substrate, wherein the first pitch is less than the second patch. The package substrate 510 can also include a plurality of interconnects (not shown) configured to communicatively cascade the interfaces of the plurality of chiplets together. The plurality of interconnects of the package substrate 510 can also be configured to communicatively couple at least one interface of at least one of the chiplets 520 to the first set of contacts 530 of the package substrate 510.

Figure 6B:
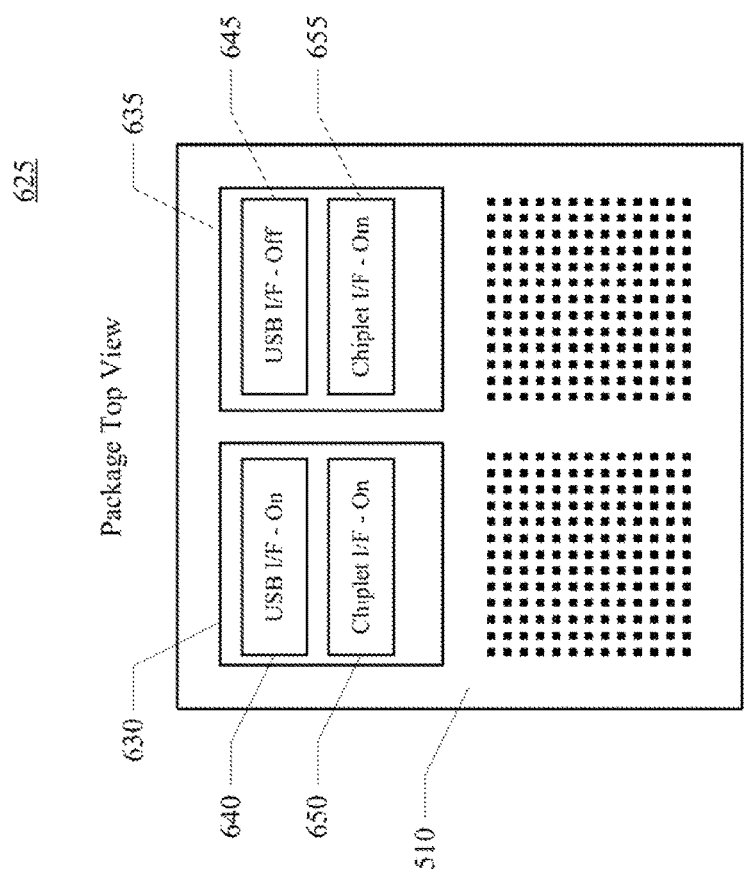
FIGS. 6A, 6B and 6C show a package of an artificial intelligence processing unit, in accordance with aspects of the present technology.
Figure 6B:
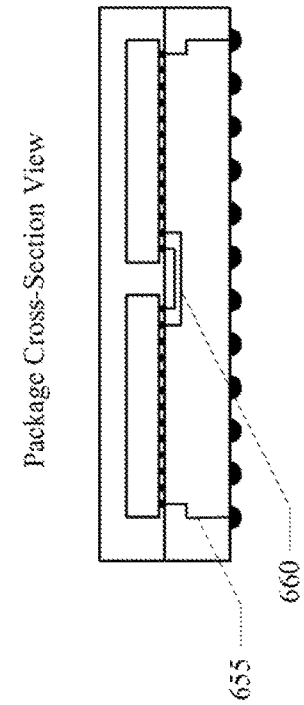
Figure 6A:
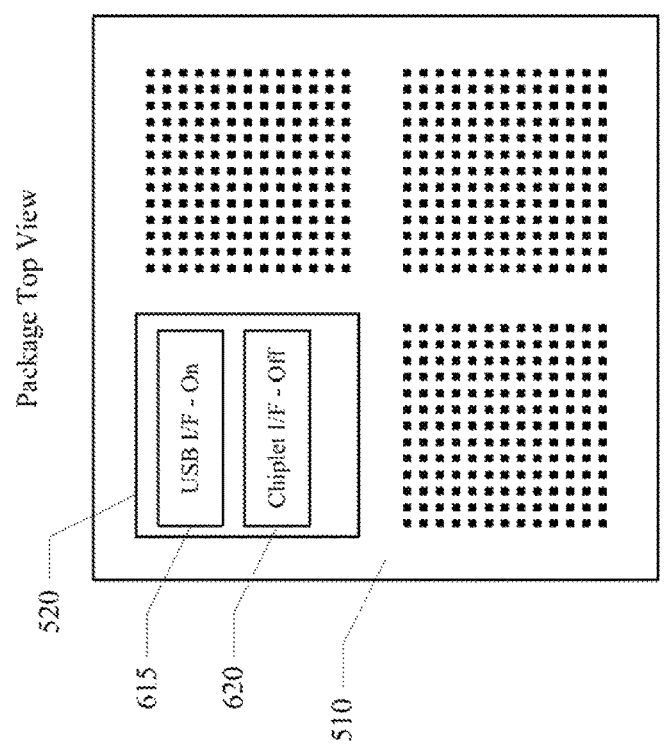
Figure 6A:
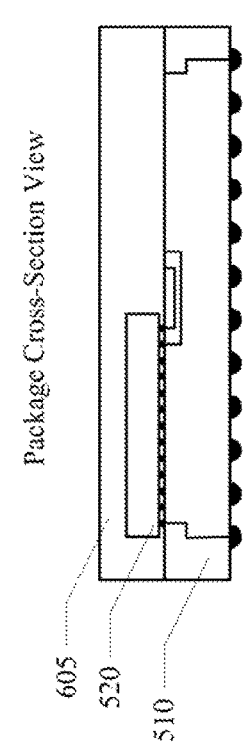
Figure 6C:
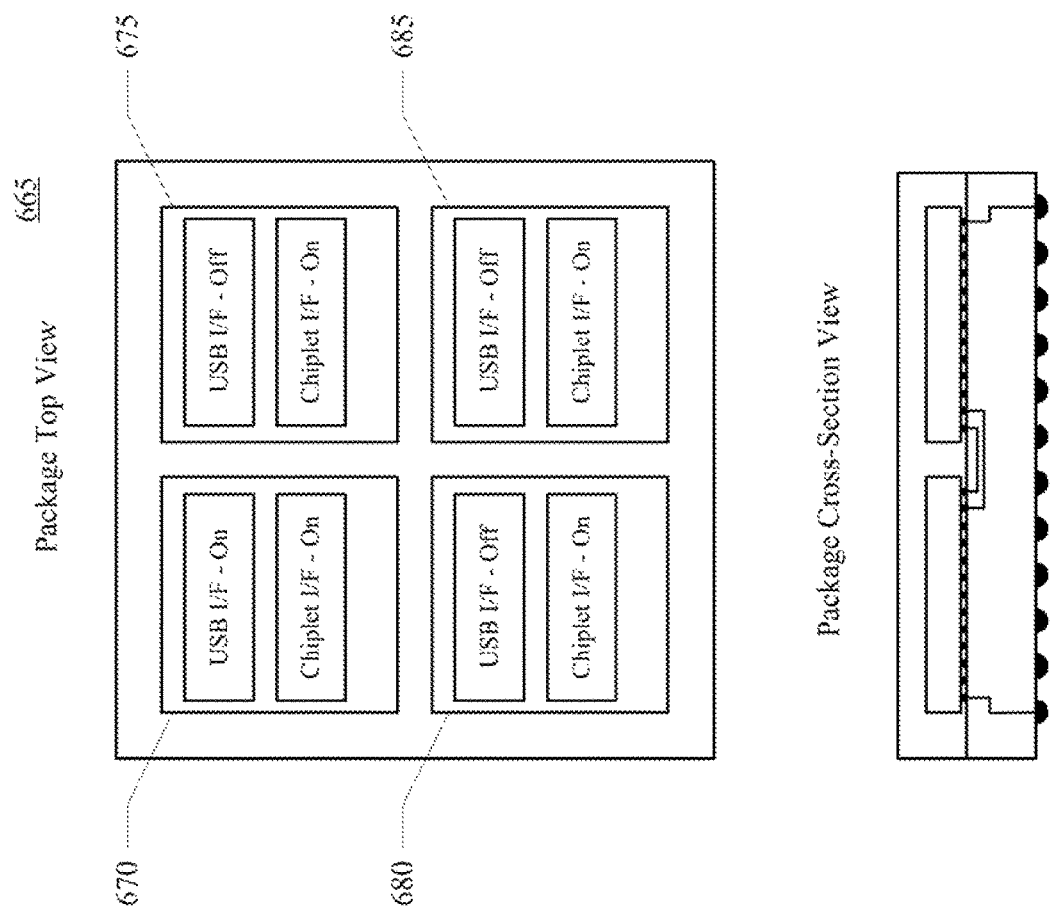

Referring now to FIGS. 6A, 6B and 6C, a package of an artificial intelligence processing unit, in accordance with aspects of the present technology, is shown. The package of the artificial intelligence processing unit can be a multi-chiplet module or the like package. The package can include a package substrate 510 and one or more chiplets 520 laterally disposed on the package substrate 510. The package can optionally include an encapsulation 605. The package can be adapted to manufacture a family of products including different numbers of cascaded chiplets.

In a first example, a package 610 can be manufactured with a single chiplet 520, as illustrated in FIG. 6A. A package 610 including a single chiplet 520 can be manufactured for applications in which an entire artificial intelligence model can fit on a single chiplet 520. The chiplet 520 can be communicatively coupled to the package substrate 510 by the respective set of contacts on the chiplet 520 and a respective one of the second set of contacts of the package substrate 510. The chiplet 520 can include an external interface 615, such as but not limited to a universal serial bus interface, and a chiplet interface 620. Because the package 610 includes a single chiplet 520, the chiplet interface for cascade coupling chiplets can be turned off. The external interface of the single chiplet 520, however is configured to be on to provide for communicating out of the package 610 to a host device for example.

In a second example, a package 625 can be manufactured with two chiplets 520, as illustrated in FIG. 6B. The package 625 including two chiplets 630, 635 can be manufactured for applications in which an entire artificial intelligence model cannot fit on a single chiplet 520. The chiplets 630, 635 can be communicatively coupled to the package substrate 510 by respective sets of contacts on the chiplets 630, 635 and respective ones of the second sets of contacts of the package substrate 510. Interconnects 655 in the package substrate 510 can couple at least one interface of at least one of the chiplets 630, 635 to the external set of contacts of the package substrate 510. Interconnects 660 in the package substrate 510 can also cascade coupled the chiplets 630, 635 together. Because the package 625 includes two chiplets 630, 635, the interfaces for cascade coupling chiplets are configured to be on. The external interface of at least one of the chiplet 630, 635 is also configured to be on to provide for communicating out of the package 625 to a host device for example.

In a third example, a package 665 can be manufactured with four chiplets 670-685, as illustrated in FIG. 6C. A package 665 including four chiplets 670-685 can be manufactured for applications in which an entire artificial intelligence model cannot fit on a lesser number of chiplets 520. Although the exemplary packages 610, 625 and 665 illustrates embodiments including one, two and four chiplets, aspects of the present technology can be extended to packages including any number of chiplets by a package substrate 510 providing for cascade coupling of the desired number of chiplets. The package substrate 510 can provide a family of products with different numbers of chiplets in a common package size (e.g., PCB footprint). The packages can also have the same external interface. The packages with different numbers of chiplets can be utilized to target different market segments. Alternatively, the package substrate 510 can be fully populated with chiplets, and fuses or the like can be used to disable chiplets to configure the different product offerings.

Figure 7:
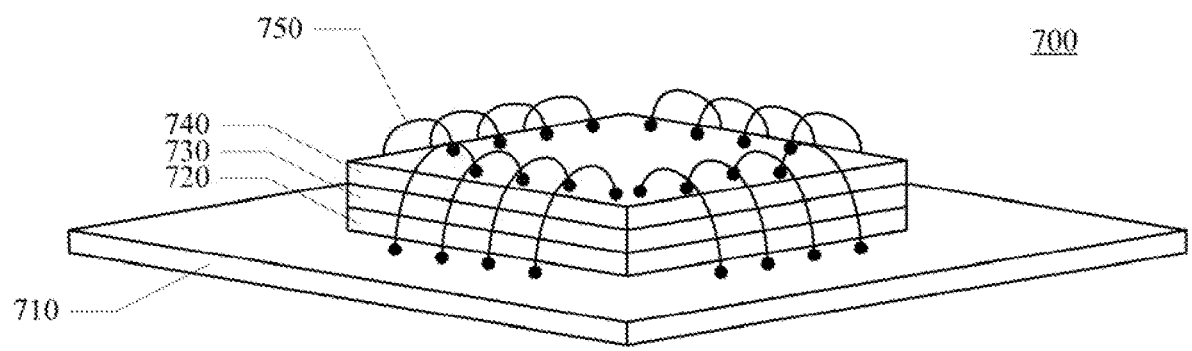
FIG. 7 shows a package of an artificial intelligence processing unit, in accordance with aspects of the present technology.

Referring now to FIG. 7, a package of an artificial intelligence processing unit, in accordance with aspects of the present technology, is shown. The package 700 can include a package substrate 710 and one or more chiplets 720-740 stacked on the package substrate 710. The stack of chiplets 720-740 can be coupled to the package substrate 710 utilizing wire bonding 750. The package 700 can optionally include an encapsulation (not shown). The stacking of the chiplet 720-740 reduces the package size (e.g., PCB footprint).

Figure 8:
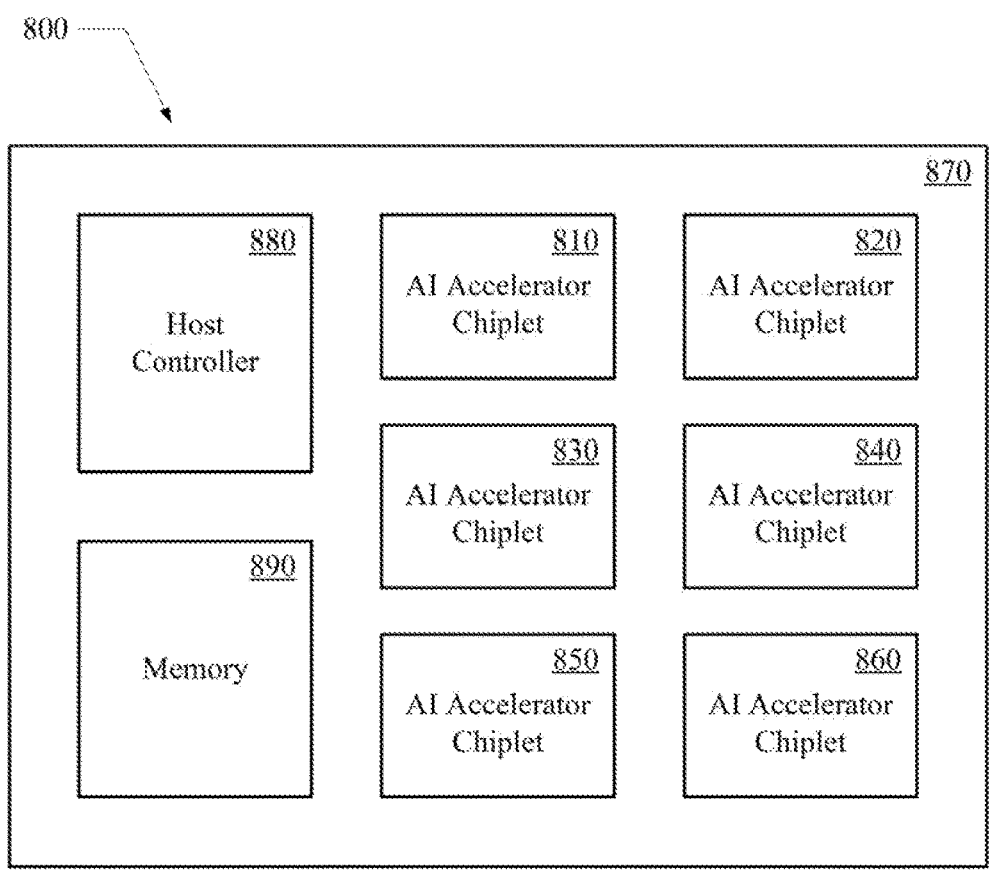
FIG. 8 shows a system-in-package including a plurality of artificial intelligence accelerator chiplets, in accordance with aspects of the present technology.

Referring now to FIG. 8, a system-in-package (SiP) including a plurality of artificial intelligence accelerators chiplets, in accordance with aspects of the present technology, is shown. The SiP 800 can include a plurality of artificial intelligence accelerator chiplet dice 810-860 disposed on a package substrate 870. The SiP 800 can also include one or more additional dice. For example, the SiP 800 can include a host controller chip 880 configured to control configuration and or operation of the plurality of AI accelerator chiplets 810-860. In another example, the SiP 800 can include a host communication controller chip (not shown) configured to manage the external interface of the plurality of artificial intelligence accelerator chiplets 810-860 and or the internal chiplet interfaces of the plurality of artificial intelligence accelerator chiplets 810-860. In another example, the SiP 800 can include a memory chip 890 configured to store data such as configuration libraries or the like.

Aspects of the present technology advantageously enable a large artificial intelligence model to be partitioned into layers and or blocks of layers and mapped to compute resources of a plurality of cascaded chiplets. Artificial intelligence model parameters can advantageously stay on the respective chiplets. Only the output of a block is streamed from one chiplet to another. Accordingly, the cascaded chiplets advantageously reduce data movement. As compared to a single chip artificial intelligence accelerator, chiplets are smaller, cheaper to manufacture, and can be better utilized. A scalable package of artificial intelligence chiplet accelerators can advantageously scale for various size artificial intelligence models. The artificial intelligence chiplet based accelerators can also run multiple artificial intelligence models at the same time, can run multiple copies of the same artificial intelligence model, and or multiple instances of layers or blocks of layers to speed up execution of a given artificial intelligence model. The cascaded interface of the chiplets advantageously provide an efficient interface that supports data streaming. The cascaded interfaces can transfer single or multiple feature map data streams between chiplets, and can also transfer commands such as chip configuration from a host device.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A processing unit comprising:
   a plurality of chiplets including interfaces to communicatively cascade the plurality of chiplets or one or more subsets of the chiplets together, wherein the plurality of chiplets or the subsets of the chiplets are configurable to execute layers or blocks of layers of one or more artificial intelligence models, wherein the plurality of chiplets or the subsets of the chiplets are configurable with parameter data of the one or more artificial intelligence models, and wherein the interfaces are configurable to transfer one or more feature map data streams directly between adjacent cascaded ones of the plurality of chiplets or adjacent cascaded ones of one or more subsets of the chiplets without writing the feature map data streams to an off-chiplet memory.

2. The processing unit of claim 1, wherein the interfaces of the chiplets includes an ingress interface and an egress interface.

3. The processing unit of claim 2, wherein the ingress interface and egress interface are symmetrical.

4. The processing unit of claim 1, wherein the interfaces are configured to transfer commands between adjacent cascaded ones of the plurality of chiplets.

5. The processing unit of claim 1, wherein the interfaces include one or more clock lines configured to transmit one or more clock signals to synchronize cascaded ones of the plurality of chiplets.

6. The processing unit of claim 1, wherein the interfaces include one or more control buses configured to transmit one or more control signals.

7. The processing unit of claim 1, wherein the interfaces include one or more data buses configured to transmit one or more data streams.

8. The processing unit of claim 1, wherein the artificial intelligence model includes one or more neural network models.

9. The processing unit of claim 1, further comprising:
a package substrate including:
 a first set of contacts configured for external coupling of the processing unit;
 a number of second sets of contacts configured to couple the plurality of chiplets;
 a plurality of interconnects configured to communicatively cascade the interfaces of the plurality of chiplets together and communicatively coupled at least one of the interfaces of at least one of the chiplets to the first set of contacts.

10. A method of configuring a processing unit comprising:
mapping a plurality of layers of an artificial intelligence model to a set of cascaded chiplets, wherein the cascaded chiplets include interfaces to communicatively cascade the chiplets together;
configuring the cascaded chiplets to execute the plurality of layers of the artificial intelligence model based on the mapping;
configuring the cascaded chiplets with parameter data of corresponding ones of the plurality of layers of the artificial intelligence model; and
configuring the interfaces to transfer one or more feature map data streams between adjacent ones of the cascaded chiplets without writing the feature map data streams to an off-chiplet memory.

11. The method according to claim 10, wherein the parameter data includes weights of an artificial intelligence model.

12. The method according to claim 10, wherein the layers of the artificial intelligence model comprises neural network layers.

13. The method according to claim 10, further comprising:
mapping a plurality of layers of a second artificial intelligence model to a second set of the cascaded chiplets;
configuring the cascaded chiplets to execute the plurality of layers of the second artificial intelligence model based on the corresponding mapping; and
configuring the cascaded chiplets with parameter data of corresponding ones of the plurality of layers of the second artificial intelligence model.

14. The method according to claim 10, further comprising:
mapping a plurality of instances of one or more layers of the artificial intelligence model to the set of the cascaded chiplets;
configuring the cascaded chiplets to execute the plurality of instances of the one or more of the layers of the artificial intelligence model based on the mapping; and
configuring the cascaded chiplets with parameter data of corresponding instances of the one or more of the layers of the artificial intelligence model.

15. A method of configuring a processing unit comprising:
coupling, in a package, a plurality of artificial intelligence accelerator chiplets in a cascade topology by a plurality of interfaces;
configuring a set of the plurality of cascade coupled chiplets to execute a plurality of layers or blocks of layers of the artificial intelligence model;
configuring the set of the plurality of cascade coupled chiplets with parameter data of corresponding ones of the plurality of layers or blocks of layers of the artificial intelligence model; and
configuring the plurality of interfaces to transfer a feature map data stream between adjacent one of the cascade coupled chiplets without writing the feature map data streams to an off-chiplet memory.

16. The method of claim 15, wherein the plurality of interfaces include one or more clock lines configured to transmit one or more clock signals to synchronize the plurality of chiplets.

17. The method of claim 16, wherein the plurality of interfaces include one or more data buses configured to transmit one or more data streams.

18. The method of claim 16, wherein the plurality of interfaces include one or more control buses configured to transmit one or more control signals to identify data stream numbers.

19. The method of claim 15, wherein the plurality of interfaces include one or more control buses configured to transmit one or more control signals to identify commands.

* * * * *